United States Patent Office 3,834,918
Patented Sept. 10, 1974

3,834,918
RAW BATCH FOR FORMING POROUS ARCHITECTURAL STRUCTURES AND METHOD OF PREPARING SAME
Shinobu Uogaeshi, 723–5, Gojyono-machi,
Kashiwara, Nara, Japan
Filed June 19, 1973, Ser. No. 371,474
Claims priority, application Japan, June 30, 1972,
47/65,022
Int. Cl. C08h 17/68
U.S. Cl. 106—122                        2 Claims

ABSTRACT OF THE DISCLOSURE

A raw batch containing fine bubbles homogeneously dispersed therein, said batch being suitably used for the formation of porous architectural structures, said batch comprising a homogeneous mixture of 100 parts by weight of a hydraulic substance, 0.0001–0.1 part by weight of a blowing agent, 0.001–1.0 part by weight of a foam stabilizer and 70–200 parts of water, and a method for production thereof.

---

Figure 1:
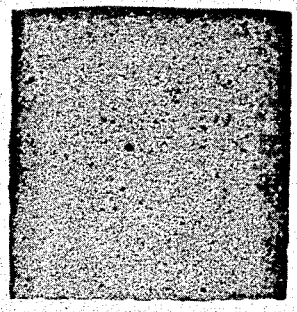

This invention relates to a raw batch suitable for use in the formation of porous architectural structures and a method of preparing same.

In view of their light weight, heat insulating and sound proof properties, as well as heat resistance, the materials for forming porous architectural structures, e.g., the porous concrete structures, are attracting attention lately as being a new building material, with the consequence that numerous methods of their preparation have been proposed. As these methods, there are known, for example, the following methods: that in which an aluminum powder and an acid or a carbonate and an acid are mixed in a cement paste to generate hydrogen gas or carbon dioxide gas, following which the cement is allowed to set; that consisting of mixing a blowing agent such as casein in the cement paste to set up the foaming and thereafter allowing the cement to set; that wherein a separately prepared foam is mixed with the cement paste followed by allowing the cement to set; that consisting of preparing the cement paste under superatmospheric pressure and thereafter allowing the cement to set under normal atmospheric pressure; that wherein a gas is generated in the cement paste by electrolysis to set up foaming in the cement paste and thereafter allowing the cement to set; and that which comprises mixing and dispersing a readily soluble or fusable substance, e.g., paraffin, in the cement paste, allowing the cement to set and thereafter removing said substance from the hardened product by dissolution or melting.

However, all of these conventional methods possess shortcomings when considered from either the technical or commercial standpoint, and hence only two or three of these methods are being actually practiced at the present time. Furthermore, even in the case of those which are being practiced, they are by no means fully satisfactory. For instance, while there is the advantage of lightness as a result of the presence of voids in the structure, on the other hand there is the disadvantage that as a result of the coarseness of the voids and the fact that they are not uniformly distributed in the structure, it frequently happens that only concrete structures poor in such properties as compressive strength, light resistance and shrinkage can be obtained.

An object of the present invention is to provide porous architectural structures which do not possess these shortcomings of the conventional methods.

Another object of the invention is to provide a raw batch suitable for use in the forming of such porous architectural structures, and a method of preparing such a raw batch.

Other objects and advantages of the invention will become apparent from the following description.

We found that a homogeneous mixture containing water, a hydraulic substance, a blowing agent and a foam stabilizer, wherein the weight ratio of water to the hydraulic substance was 0.7–2 and the blowing agent and the foam stabilizer were each contained in a specific proportion was a raw batch which could achieve the foregoing objects of this invention. That is, according to the present invention, there is provided a raw batch containing homogeneously dispersed fine bubbles, which is suitably used for the building of porous architectural structures, the raw batch comprising a homogeneous mixture of 100 parts by weight of a hydraulic substance, 0.0001–0.1 part, preferably 0.001–0.05 part, by weight of a blowing agent, 0.001–1.0 part, preferably 0.01–0.8 part, by weight of a foam stabilizer and 70–200 parts by weight of water.

By the term "hydraulic substance," as used herein, is meant a substance which has the property of hardening by setting up a hydration reaction when mixed with water. Typical examples of the hydraulic substances to be used in the invention are the cements such as portland cement and aluminous cement. Blast furnace slag can also be used as hydraulic substance in this invention, though its hydration reaction is mild and much time is required for its setting. Further, though the mixture of quicklime and siliceous sand only sets up a hydration reaction at elevated temperatures and high pressures such as 180° C. and 10 atmospheres, this also is included in the hydraulic substances in this invention.

By the term "blowing agent" is meant a substance that can introduce a multiplicity of fine air bubbles into a slurry composed of a hydraulic substance and water when the blowing agent is added to the slurry, and the slurry is stirred in air, typical examples of this blowing agent being saponin, resined soap, colloid gelatin, etc. Of these, saponin is the most preferred blowing agent for use in the present invention.

The "foam stabilizer" is a substance which functions to stabilize the fine bubbles in the slurry, ensuring that the fine bubbles introduced into the slurry by the foregoing blowing agent do not disappear or form large bubbles by the union of a plurality of the fine bubbles. Typical examples of the foam stabilizer usable in the present invention are the water-soluble cellulose derivatives such as methyl cellulose, ethyl cellulose, hydroxypropylmethyl cellulose, etc., as well as the water-soluble synthetic polymers such as polyvinyl alcohol, the salts of polyacrylic acid, the salts of polymethacrylic acid, etc. Of these, the preferred foam stabilizers include hydroxypropylmethyl cellulose, polyvinyl alcohol and the salts of polyacrylic acid.

The weight ratio of the water to the hydraulic substance in the raw batch of the present invention should be in the range of 0.7–2.0. That is, the amount of water must be in the range of 70–200 parts by weight per 100 parts by weight of the hydraulic substance. The raw batch of the invention containing water and the hydraulic substance in a ratio ranging 0.7–2.0 in the copresence of the aforementioned blowing agent and foam stabilizer in specific amounts is in a state as if the hydraulic substance and bubbles are floating in water. In this state the pressure that is exerted on the bubbles is only static water pressure. Hence, bubbles of the invention raw batch can be maintained stably and homogeneously dispersed in the batch. In the conventional foamed concrete compositions which did not use a blowing agent and a foam stabilizer such as specified by the present invention, it was thought that the employment of a large value of above 0.7 for the ratio of water to the hydraulic substance was to be avoided, since the separation of the water and hydraulic substance and/or the separation of the water and the bubbles would occur to cause a drop in the strength of the hardened product. However, the raw batch of the present invention contains water and the hydraulic substance in a ratio of water to the hydraulic substance of 0.7–2.0, a high ratio exceeding that which had been considered to be reasonable from the past experience. A major feature of the invention resides in the point that because of this high water content the fine bubbles can be held in a stable as well as homogeneously dispersed state, with the consequence that hardened products of great strength are provided.

The invention raw batch can be prepared by mixing and stirring the hydraulic substance, water, blowing agent and foam stabilizer by any method. As feasible methods, the following can be mentioned: (a) that which consists in mixing and stirring the hydraulic substance, water, blowing agent and foam stabilizer together without interruption; (b) that wherein a homogeneously foamed mixture consisting of the blowing agent, foam stabilizer and water is added to a slurry consisting of the hydraulic substance and water, and the resulting mixture is stirred and kneaded together; (c) that wherein a slurry consisting of the hydraulic substance and water is added to a homogeneously foamed mixture consisting of the blowing agent, foam stabilizer and water, after which the resulting mixture is stirred and kneaded together; and (d) that which comprises mixing together in small increments a slurry consisting of the hydraulic substance and water and a homogeneously foamed mixture consisting of the blowing agent, foam stabilizer and water. In the case of the homogeneously foamed mixture consisting of the blowing agent, foam stabilizer and water mentioned in methods (b), (c) and (d), it is possible to prepare a concentrated mixture in advance and to use this suitability diluted as required.

Of the foregoing methods, method (c) is the most convenient in achieving the objects of the invention in that it is suitable for the forming of porous architectural structures of especially low specific gravity. In addition, there is also the advantage that the time required for the mixing and kneading of the mixture is the shortest in the use of this method. In preparing the invention raw batch by the method (c), an especially preferred procedure is to add a slurry consisting of 100 parts by weight of a hydraulic substance and 30–80 parts by weight of water to a homogeneously foamed mixture consisting of 0.0001–0.1 part by weight of a blowing agent, 0.001–1.0 part by weight of a foam stabilizer and 40–120 parts by weight of water and thereafter stirring and kneading the mixture. When the amount of water contained in the slurry is less than 30 parts by weight in this case, the fluidity of the slurry declines, with the consequence that more energy is required for the stirring and kneading operation. On the other hand, when the amount of water contained in the slurry exceeds 80 parts by weight, in concomitance therewith, the amount of water contained in the foamed mixture consisting of the blowing agent, foam stabilizer and water must be reduced correlatively, with the consequence that it tends to become difficult to obtain fine bubbles.

The foregoing methods (a), (b) and (d) are in all cases somewhat disadvantageous as compared with the method (c): in the case of method (a), in that a somewhat longer time is required for obtaining the desired raw batch; in the case of method (b), in that it is somewhat difficult to obtain porous architectural structures of low specific gravity; and in the case of the method (d), in that a special tank is required for the stirring and kneading operation.

However, in any case, it is possible to obtain according to this invention a raw batch containing fine bubbles homogeneously and stably dispersed therein without causing the separation of water and the hydraulic substance and/or the bubbles. Hence, when this invention raw batch is directly poured into forms, it sets therein with the as-planned dimensions without a sinking of its height. Moreover, in the case where the structure is to be reinforced with reinforcing bars, the hardened product and the reinforcing bars are firmly bonded to make possible the formation of the desired porous structure.

In the case of the formation of a porous concrete structure by the conventional methods described at the beginning of this discussion, the foaming operation had to be carried out in the form, with the consequence that for obtaining a structure conforming to one's desire difficulty was experienced in the technical management of the operation. In contrast, in the case of the invention raw batch which contains the fine bubbles homogeneously dispersed therein, it is made externally of the form and such as to contain a precalculated amount of the bubbles. Further, these bubbles being stable do not disintegrate nor unite into larger bubbles. Hence, when this raw batch is poured into a form and cause to set therein, a porous structure having accurate dimensions is obtained. The resulting porous structure usually has a specific gravity of 0.2–2.0. In addition, since the voids are uniformly dispersed with no localized disintegration of the voids nor their union, there is no density difference over the whole of the structure, and it also excels in its insulating properties and strength.

Figure 2:
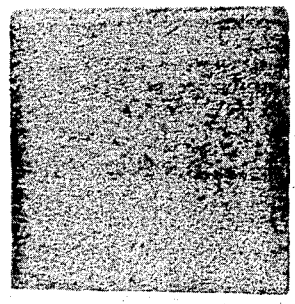
Figure 3:
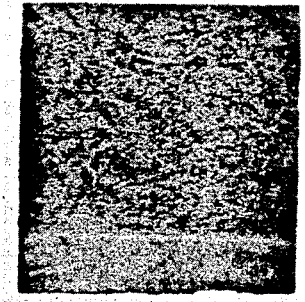
Figure 4:
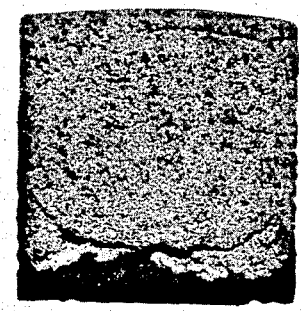

The accompanying illustrations are presented for demonstrating these excellent properties of the porous structure made from the raw batch of the present invention;

FIG. 1 being a photographic side view of the porous structure obtained in Example 3;

FIG. 2 being a photographic side view of the porous structure obtained in Example 4;

FIG. 3 being a photographic side view of the porous structure obtained in Control 3; and FIG. 4 being a photographic side view of the porous structure obtained in Control 4.

The raw batch of the invention can, of course, be incorporated, if necessary, with such additives as a rapid-hardening agent (an additive for accelerating the development of strength and expediting the removal of the form) such as sodium hydroxide, calcium chloride, etc., a dispersing agent (an additive for assisting the dispersal of the foam stabilizer) such as alumina powder, silica powder, etc., an aggregate such as sand, gravel, vermiculite, foamed shale, etc., an extender or reinforcing agent such as glass fibers, asbestos, nylon fibers, polypropylene fibers, polyvinyl alcohol fibers, polyvinyl chloride fibers, bast fibers, etc., a colorant such as the organic and inorganic pigments, and the like.

The following examples are given for specifically illustrating the invention. In the examples, the parts are in all cases on a weight basis.

Example 1

A mixing tank equipped with a stirrer was charged with 100 parts of portland cement, 30 parts of sand, 0.01 parts of saponin, 0.5 part of hydroxypropylmethyl cellulose and 100 parts of water, following which the mixture was stirred and mixed at a stirring speed of 250 r.p.m. to prepare a raw batch of the invention. This raw batch had stably incorporated therein fine bubbles which were homogeneously dispersed throughout the batch. In addition, this raw batch possessed good fluidity.

When this raw batch was poured into a form and allowed to set, a porous structure was obtained without sinkage of its placed height. On microscopic examination of this structure, fine voids were found to be homogeneously distributed throughout the structure. Hence, there was also uniformity in the mechanical strength of this structure.

Control 1

When, by way of comparison, the experiment was carried out exactly as in Example 1 but without using the hydroxypropylmethyl cellulose, a raw batch having fine bubbles homogeneously dispersed throughout the batch could not be obtained. The reason for this was that the fine bubbles only formed in the upper portion of the mass that was being stirred and mixed, and moreover these bubbles tended to become disintegrated and disappear, with the consequence that the lower portion of the mass was maintained in a pasty or slurry state not containing any bubbles.

When this raw batch was placed to a height of 300 millimeters, a separated layer of a height of about 65 millimeters was formed.

Control 2

Again, by way of comparison, the experiment was carried out as in Example 1, except that saponin was not used. In this case, there was a drop in the air entrainment capacity of hydroxypropylmethyl cellulose, and fine bubbles could not be formed adequately. Hence, a raw batch such as obtained in Example 1 could not be obtained.

Example 2

A slurry was prepared by mixing 100 parts of portland cement, 50 parts of sand and 75 parts of water with stirring. Separately, a homogeneously foamed mixture was prepared by adding 0.012 part of saponin and 0.6 part of hydroxypropylmethyl cellulose to 75 parts of water followed by vigorous stirring. Next, the foregoing slurry was introduced all at once to this foamed mixture, and the resulting mixture was kneaded together with stirring to prepare a raw batch of the invention containing fine bubbles homogeneously dispersed therein.

When this raw batch was placed to a height of 300 millimeters and allowed to set, only a sinkage of 1 millimeter was noted. The resulting structure had a compressive strength of 40 kg./cm.$^2$. On microscopic examination of this structure, fine voids were found to be homogeneously distributed throughout the structure.

Examples 3 and 4 and Controls 3 and 4

Various types of raw batches and porous structures were prepared by operating as in Example 2. The details are shown in the following table.

of water and vigorous stirring of the mixture. This was followed by introducing this foamed mixture all at once to the foregoing slurry and then kneading the mixture with stirring to prepare a raw batch of the invention containing fine bubbles homogeneously dispersed therein.

When this raw batch was placed to a height of 300 millimeters and allowed to set, a sinkage of only 3 millimeters was noted. The resulting porous structure had a compressive strength of 35 kg./cm.$^2$.

Example 6

A slurry prepared by mixing 100 parts of white portland cement and 35 parts of water with stirring and a homogeneously foamed mixture prepared by the addition of 0.01 part of glue and 0.35 part of hydroxypropylmethyl cellulose to 35 parts of water followed by vigorous stirring were kneaded together with stirring while being introduced concurrently into a single tank in small increments. Thus, a raw batch of the invention containing fine bubbles homogeneously dispersed therein was obtained.

When this raw batch was placed to a height of 300 millimeters and allowed to set, a sinkage of only 3 millimeters was noted. The resulting porous structure had a compressive strength of 34 kg./cm.$^2$.

What we claim:

1. A method for preparing a raw batch containing fine bubbles homogeneously dispersed therein, said batch being suitably used for the formation of porous architectural structures, said method comprising
   (1) adding
      (a) a homogeneous slurry consisting essentially of
         (i) 100 parts by weight of a hydraulic substance selected from the group consisting of cement, blast furnace slag, and a mixture of quicklime and siliceous sand and
         (ii) 30–80 parts by weight of water to
      (b) a homogeneously foamed mixture consisting essentially of
         (i) 0.0001–0.1 part by weight of a blowing agent selected from the group consisting of saponin, resined soap and colloid gelatin,
         (ii) 0.001–1.0 part by weight of a foam sta-

|  | Raw batch | | | | | | | Porous structure | | |
|---|---|---|---|---|---|---|---|---|---|---|
|  | Slurry | | | Foamed mixture | | | | | | |
|  | Portland cement (part) | Sand (part) | Water (part) | Saponin (part) | Hydroxy-propyl-methyl cellulose (part) | Water (part) | Water-cement ratio | Sinkage from placed height (300 mm.) (mm.) | Time required for setting (hr.) | Compressive strength (kg./cm.$^2$) |
| Example 3 | 100 | 50 | 35 | 0.012 | 0.6 | 35 | 0.7 | 2 | 5.5 | 38 |
| Example 4 | 100 | 40 | 50 | 0.012 | 0.6 | 150 | 2.0 | 1 | 5.5 | 40 |
| Control 3 | 100 | 50 | 30 | 0.012 | 0.6 | 20 | 0.5 | 10 | 6.0 | 30 |
| Control 4 | 100 | 50 | 80 | 0.012 | 0.6 | 220 | 3.0 | 7 | 7.0 | 27 |

FIGS. 1, 2, 3 and 4 are photographic side views of respectively porous structure obtained in Examples 3 and 3 and Controls 3 and 4. It can be observed from FIGS. 1 and 2 that fine voids are homogeneously distributed throughout the structure in the case of the porous structure obtained according to the present invention. On the other hand, in the case of the structure of FIG. 3, owing to the water-cement ratio being too low, sinkage and separation phenomena were set up, and it is seen that the structure becomes increasingly less dense toward the upper portion and more dense towards the lower portion. Again, in the case of the structure of FIG. 4, owing to the water-cement ratio being too high, sinkage and separation phenomena are set up as in the above case and, in addition, cracks were noted in the structure.

Example 5

A slurry was prepared by mixing with stirring 100 parts of white portland cement, 25 parts of sand and 70 parts of water. Separately, a homogeneously foamed mixture was prepared by adding 0.005 part of calcium stearate and 0.5 part of sodium polyacrylate to 80 parts bilizer selected from the group consisting of methyl cellulose, ethyl cellulose, hydroxypropylmethyl cellulose, polyvinyl alcohol, salts of polyacrylic acid and salts of polymethacrylic acid, and
         (iii) 40–120 parts by weight of water, and
   (2) stirring and kneading together the resulting mixture.

2. A porous architectural structure formed by pouring the raw batch prepared by the method of claim 1 into a form and allowing it to set therein.

References Cited

UNITED STATES PATENTS 2,432,971  12/1947  Rutherman _____ 106—86
2,232,588  2/1941  Camp _____ 106—86

THEODORE MORRIS, Primary Examiner

U.S. Cl. X.R.

106—86, 93

UNITED STATES PATENT OFFICE
CERTIFICATE OF CORRECTION

Patent No. 3,834,918                    Dated   September 10, 1974

Inventor(s)         Shinobu UOGAESHI

It is certified that error appears in the above-identified patent and that said Letters Patent are hereby corrected as shown below:

In the Heading, insert the following:  -- Assignor to Teijin Limited of Osaka, Japan --

Signed and sealed this 31st day of December 1974.

(SEAL)
Attest:

McCOY M. GIBSON JR.                C. MARSHALL DANN
Attesting Officer                  Commissioner of Patents